US009355568B2

(12) United States Patent
Stone

(10) Patent No.: US 9,355,568 B2
(45) Date of Patent: May 31, 2016

(54) SYSTEMS AND METHODS FOR PROVIDING AN ELECTRONIC READER HAVING INTERACTIVE AND EDUCATIONAL FEATURES

(76) Inventor: Joyce S. Stone, Provo, UT (US)

( * ) Notice: Subject to any disclaimer, the term of this patent is extended or adjusted under 35 U.S.C. 154(b) by 1199 days.

(21) Appl. No.: 12/390,379

(22) Filed: Feb. 20, 2009

(65) Prior Publication Data
US 2009/0239202 A1 Sep. 24, 2009

Related U.S. Application Data

(63) Continuation-in-part of application No. 11/938,686, filed on Nov. 12, 2007, now Pat. No. 8,113,842.

(60) Provisional application No. 60/858,614, filed on Nov. 13, 2006.

(51) Int. Cl.
G09B 19/00 (2006.01)
G09B 5/00 (2006.01)
G09B 5/06 (2006.01)
G09B 5/04 (2006.01)

(52) U.S. Cl.
CPC ... *G09B 5/00* (2013.01); *G09B 5/04* (2013.01); *G09B 5/06* (2013.01)

(58) Field of Classification Search
USPC ..................... 434/307 R, 307, 350
See application file for complete search history.

(56) References Cited

U.S. PATENT DOCUMENTS

| 1,412,204 | A | | 4/1922 | Lee |
| 3,670,427 | A | | 6/1972 | Stolpen |
| 3,674,264 | A | | 7/1972 | Boercker |
| 3,683,516 | A | | 8/1972 | Fass |
| 3,750,307 | A | | 8/1973 | Phillips et al. |
| 3,872,975 | A | | 3/1975 | Silver |
| 4,158,921 | A | | 6/1979 | Stolpen |
| 4,219,197 | A | | 8/1980 | Acuff |
| 4,437,667 | A | | 3/1984 | Miller |
| 4,519,606 | A | | 5/1985 | Lussiez |
| 5,239,665 | A | * | 8/1993 | Tsuchiya ........... G09B 5/02 715/776 |
| 5,463,725 | A | * | 10/1995 | Henckel ........... G06F 3/0483 345/473 |
| 5,523,775 | A | * | 6/1996 | Capps ........... G06F 3/04842 178/18.01 |

(Continued)

FOREIGN PATENT DOCUMENTS

WO WO 2008/064009 A2 5/2008

OTHER PUBLICATIONS

AV Bros. Copyright 2004.*

(Continued)

*Primary Examiner* — Robert J Utama
(74) *Attorney, Agent, or Firm* — David B. Tingey; Bryant J. Keller; Kirton McConkie

(57) ABSTRACT

The present invention relates to an electronic reader. More particularly, the present invention relates to systems and methods for providing an electronic reader having interactive and educational features. Generally, the electronic reader allows a user to view text on a visually perceptible output device (e.g., a screen) and to interact with the electronic reader through a tactile input device (e.g., a mouse). The user selects and, thereby, visually and/or audibly emphasizes words in the text through the use of the tactile input device. In some cases, the electronic reader records and reports the words that the user selects. Additionally, in some cases, pages of text displayed on the visually perceptible output device can be peeled back to reveal additional pages of text.

21 Claims, 14 Drawing Sheets

(56) References Cited

U.S. PATENT DOCUMENTS

| | | | |
|---|---|---|---|
| 5,661,635 A * | 8/1997 | Huffman | G06F 15/0283 345/901 |
| 5,702,105 A | 12/1997 | Glikmann | |
| 5,761,485 A * | 6/1998 | Munyan | G06F 15/0283 326/8 |
| 5,774,109 A * | 6/1998 | Winksy | G06F 3/0485 345/169 |
| 5,799,267 A | 8/1998 | Siegel | |
| 5,802,516 A * | 9/1998 | Shwarts | G06F 3/0483 |
| 5,803,743 A | 9/1998 | Kaufman | |
| 5,860,064 A * | 1/1999 | Henton | G10L 13/033 204/266 |
| 5,947,741 A | 9/1999 | Villarreal | |
| 5,991,594 A * | 11/1999 | Froeber | G06F 15/0283 345/901 |
| 6,052,663 A * | 4/2000 | Kurzweil | G06F 3/16 704/260 |
| 6,137,906 A * | 10/2000 | Dionne | H04N 1/00127 382/176 |
| 6,229,502 B1 * | 5/2001 | Schwab | G06F 15/0283 345/1.1 |
| 6,358,059 B1 | 3/2002 | Li | |
| 6,360,237 B1 * | 3/2002 | Schulz | G10L 15/22 704/231 |
| 6,435,504 B1 | 8/2002 | Nightingale | |
| 6,435,877 B2 | 8/2002 | Wasowicz | |
| 6,519,571 B1 * | 2/2003 | Guheen | G06Q 30/02 705/14.66 |
| 6,563,514 B1 * | 5/2003 | Samar | 715/711 |
| 6,685,477 B1 | 2/2004 | Goldman et al. | |
| 6,985,135 B2 * | 1/2006 | Sugimoto | G06F 1/1616 345/169 |
| 7,011,525 B2 | 3/2006 | Mejia | |
| 7,020,663 B2 * | 3/2006 | Hay | G06Q 30/06 434/317 |
| 7,185,274 B1 * | 2/2007 | Rubin | G06F 17/2235 707/E17.013 |
| 7,218,313 B2 * | 5/2007 | Marcus | G06F 1/1626 345/168 |
| 7,337,389 B1 * | 2/2008 | Woolf | G06F 17/241 345/629 |
| 7,350,704 B2 * | 4/2008 | Barsness | G06F 17/30716 235/375 |
| 7,516,073 B2 * | 4/2009 | Kodama | G09B 5/06 434/309 |
| 7,636,071 B2 * | 12/2009 | O'Gorman | G06F 1/1616 345/1.1 |
| 7,748,634 B1 * | 7/2010 | Zehr | G06F 1/1626 235/375 |
| 2001/0051329 A1 * | 12/2001 | Lynch | G06F 3/0224 434/317 |
| 2002/0054073 A1 * | 5/2002 | Yuen | G06F 17/30746 715/727 |
| 2002/0076677 A1 | 6/2002 | Wasowicz et al. | |
| 2002/0180767 A1 * | 12/2002 | Northway | G06F 1/1626 345/698 |
| 2003/0014674 A1 * | 1/2003 | Huffman | G06F 1/1616 713/300 |
| 2003/0031987 A1 | 2/2003 | Gore et al. | |
| 2006/0026536 A1 * | 2/2006 | Hotelling | G06F 3/0418 715/863 |
| 2006/0066510 A1 * | 3/2006 | Takahashi | G06F 17/3028 345/9 |
| 2006/0133664 A1 * | 6/2006 | Hong | G06F 3/0483 382/154 |
| 2006/0194181 A1 * | 8/2006 | Rosenberg | G09B 5/06 434/317 |
| 2006/0256083 A1 * | 11/2006 | Rosenberg | G06F 3/013 345/156 |
| 2007/0005616 A1 * | 1/2007 | Hay et al. | 707/100 |
| 2008/0182230 A1 | 7/2008 | Stone | |
| 2008/0204426 A1 * | 8/2008 | Hotelling et al. | 345/173 |
| 2009/0253106 A1 | 10/2009 | Gore et al. | |

OTHER PUBLICATIONS

Franseth et al., "Survey of Research on Grouping as Related to Pupil Learning", Educational Resources Information Center, 1966, (ED013697).

Bossert et al., "Grouping for Instruction. A Catalog of Arrangements", Educational Resources Information Center, Jan. 1981, (ED201052).

\* cited by examiner

SYSTEMS AND METHODS FOR PROVIDING AN ELECTRONIC READER HAVING INTERACTIVE AND EDUCATIONAL FEATURES

RELATED APPLICATIONS

This application is a continuation-in-part of U.S. patent application Ser. No. 11/938,686, entitled SYSTEMS AND METHODS FOR PROVIDING EDUCATIONAL STRUCTURES AND TOOLS, filed Nov. 12, 2007, which claims priority to U.S. Provisional Application Ser. No. 60/858,614, filed Nov. 13, 2006, entitled SYSTEMS AND METHODS FOR PROVIDING EDUCATIONAL STRUCTURES AND TOOLS, the entire disclosures of which are both incorporated herein by reference.

BACKGROUND OF THE INVENTION

1. Field of the Invention

The present invention relates to an electronic reader. More particularly, the present invention relates to systems and methods for providing an electronic reader having interactive and educational features.

2. Background and Related Art

Reading is an important skill that is not only fundamental to a person's educational development, but is also essential to a person's ability to compete in today's world. That is, the ability to read is a skill that is often needed to progress educationally, vocationally, socially, and financially in today's society. Additionally, reading is often a source of entertainment.

Reading materials come in a wide variety of formats and types of media. For example, some reading materials, such as books, magazines, papers, signs, and the like are physically tangible ("physical print reading materials"). In another example, however, other reading materials, such as those displayed on a television, a computer, the Internet, and so forth, are found in a physically intangible, electronic format.

Reading materials in an electronic format, such as electronic-books, or e-books, have become increasingly popular and may offer several advantages over physical print reading materials. In one example, unlike physical print reading materials, e-books can save space by not requiring an area for physical storage. In another example, e-books may not be as susceptible to traditional physical wear and tear as are many physical print reading materials. In yet another example, e-books may offer additional features, such as electronic searching and zooming, that are not available in physical print reading materials.

Unfortunately, many conventional e-books have shortcomings or limitations. For example, some e-books require a level of computer literacy that is higher than that possessed by many young children and those who are unfamiliar with computers and e-books. Accordingly, some may find such e-books difficult and frustrating to use without help from another person. In another example, some e-books present reading materials in a format that is foreign or uncomfortable to many people. For instance, some e-books may remove the pictures, present the pictures in a different color than is found in the physical print version of the reading material, or change the pages through scrolling. In still another example, some e-books are configured for use by literate persons and do little to teach novice readers to read or improve their reading skills. For instance, many e-books are focused on merely providing a document for reading and offer little, if any, educational feedback. In a final example, many e-books are made to provide reading materials to a broad range of people and do little to tailor the reading experience to a particular reader.

Thus, while techniques currently exist that are used to provide reading materials in an electronic format, such as through e-books, challenges still exist, including those previously mentioned. Accordingly, it would be an improvement in the art to augment or even replace current techniques with other techniques.

SUMMARY OF THE INVENTION

The present invention relates to an electronic reader. More particularly, the present invention relates to systems and methods for providing an electronic reader having interactive and educational features.

Implementation of the electronic reader takes place in association with a computer program product used within a computer system and/or network. Generally, a suitable computer system includes both a visually perceptible output device (e.g., a screen, a monitor, etc.) and a tactile input device (e.g., a mouse, a touch-screen, a stylus, etc.). A user views text on the visually perceptible output device and is able to interact with the electronic reader in a variety of ways.

For example, through the use of the tactile input device, the user can select at least a portion of a text (e.g., a word) that is displayed on the visually perceptible output device. The user selects portions of the text in any suitable manner, including through a soft select (e.g., by passing a cursor, stylus, finger, etc. over of a word) or a hard select (e.g., by clicking, touching, or tapping a word). As the user selects individual words, the words are visually and/or audibly emphasized. Because the words can be selected at pace selected by the user, the user can determine the speed at which individual words are visually and/or audibly emphasized.

In some instances where the user soft selects a word, the word is visually and/or audibly emphasized. Indeed, in some cases, when the user soft selects a word, the word is given visual emphasis. For instance, the word is highlighted, underlined, italicized, bolded, enlarged, capitalized, and/or otherwise distinguished from other words in the text in any other visually perceivable manner. In other cases, when the user soft selects a word, the word is given audible emphasis. For instance, the word can be audibly pronounced, sounded out, spelled out, and/or otherwise distinguished from other words in the text in any other suitable and audibly perceivable manner. In still other cases, when the user soft selects a word, the word is both visually and audibly emphasized. For instance, the word is audibly pronounced and highlighted.

In some instances where the user hard selects a word, the e-reader visually and/or audibly emphasizes the word. Indeed, in some cases, when the user hard selects a word, the word is given visual emphasis. In other cases, when the user hard selects a word, the word is given audible emphasis. In still other cases, when the user hard selects a word, the word is both visually and audibly emphasized.

In some cases, the user can choose from a variety of settings that determine the effect of a soft or hard select on a word. In one example of such a setting, the electronic reader highlights words as they are soft selected. In another example, the electronic reader highlights words as they are soft selected and pronounces words as they are hard selected. Accordingly, the user can be taught to read or pronounce selected words.

Although in some cases, words in the text are automatically emphasized visually and audibly, in other cases, words in the text are automatically emphasized only visually or audibly. In such cases, the user can choose to have some or all words emphasized in a manner different from the automated manner. For instance, where the words of a text are automatically pronounced, the user can select words in the text to be highlighted. Conversely, where the individual words of a text are automatically highlighted, the user can select desired words to be pronounced.

In some instances, the electronic reader collects information concerning the user's reading and provides reports. In such instances, the electronic reader can collect any suitable information and report the information in any suitable manner. By way of example, the electronic reader can record the number of times the user selects a word to be audibly emphasized, the user's reading pace, and/or the types of words the user selects. Accordingly, the electronic reader can identify the user's progress, reading pace, problematic words, problematic pronunciations, strengths, etc. By collecting information about the words user selected, looked up, or sought clarification on, the user, the electronic reader, or another (e.g., an instructor) can immediately identify areas in which the user lacks understanding. Similarly, by recording such information, the electronic reader can provide the user with a list of problematic words; can adapt the text to user's specific needs; can suggest books, texts, lessons, or other materials to help the user improve in a needed area.

In some implementations, the electronic reader can simulate physical print reading materials. Indeed, the electronic reader can have any characteristic that allows it to be used in a manner similar to that in which a physical print reading material would be used. For example, the electronic reader could include a virtual library, a virtual bookshelf, a virtual bookmark, or allow pages to be turned in a manner similar to that in which pages are turned in some physical print reading materials. For example, a first page of text displayed on the visually perceptible device can be turned to reveal a second page of the text by peeling a first perimeter (e.g., a corner) of the first page away from its original position.

Where a first page of the text is peeled away to reveal another page, the first page may be peeled way in any suitable manner. For instance, the first perimeter of the first page can be peeled over to any other perimeter of the first page to reveal the second page. Indeed, in some cases, the first perimeter of the first page is peeled over to a corresponding opposite perimeter on the first page to reveal the second page. For example, where the upper-right-hand corner is the first perimeter of the first page, that corner can be peeled over to the upper-left-hand corner (a corresponding and opposite perimeter) of the first page so as to reveal the second page.

Where the pages of the text are peeled away to reveal additional pages, the page turning can be initiated by the user in any suitable manner. For example, the user can change a page by soft selecting, hard selecting, or both soft and hard selecting a desired perimeter.

In addition to the previously mentioned aspects, the electronic reader can be varied in any suitable manner. In one example, individual words in the text may be linked to additional information or sources outside the text. In another example, the reader is capable of being populated with data, manipulated, analyzed, linked, and viewed efficiently.

While the methods and processes of the present invention have proven to be particularly useful for teaching beginning readers to read, those skilled in the art can appreciate that the methods and processes can be used in a variety of different applications and in a variety of different areas. For example, the described electronic reader can be used for leisure reading, educational reading, language studies, and any other suitable application.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to an electronic reader. More particularly, the present invention relates to systems and methods for providing an electronic reader having interactive and educational features.

The following disclosure of the present invention is grouped into 2 subheadings, namely "Exemplary Operating Environment" and "Electronic Reader." The utilization of the subheadings is for convenience only and is not to be construed as limiting in any sense.

Exemplary Operating Environment

Figure 1:
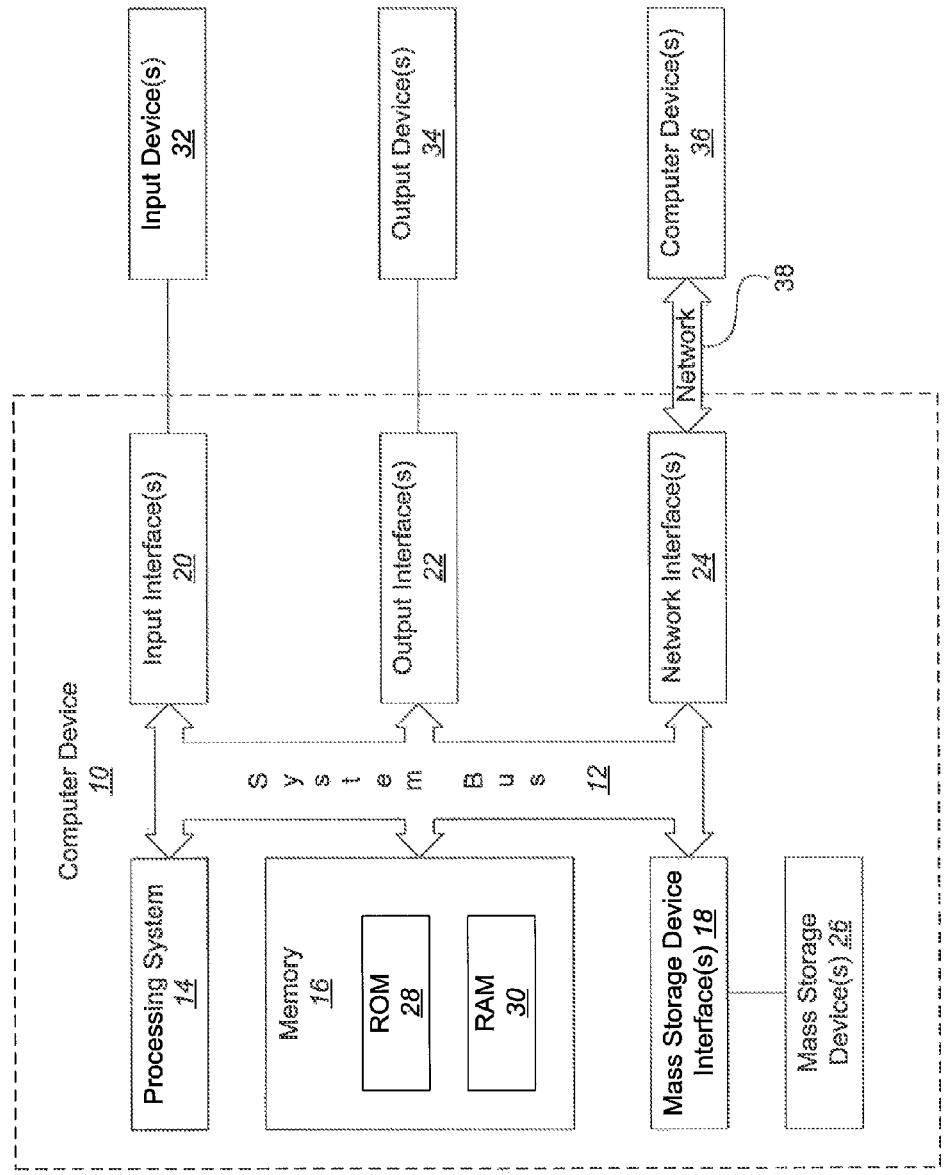
FIG. 1 illustrates a representative system that provides a suitable operating environment for use with the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a tablet computer, a personal digital assistant ("PDA"), or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a microphone, a joystick, a game pad, a satellite dish, a scanner, a camcorder, a digital camera, a tactile input device, and the like. Some examples of tactile input devices can include a keyboard and alternate input devices, such as a mouse, trackball, light pen, stylus, touchpad, touch-screen, or any other suitable pointing device. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a speaker, a printer, a visually perceptible output device (e.g., a monitor, display screen, or any other suitable visualization device), and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
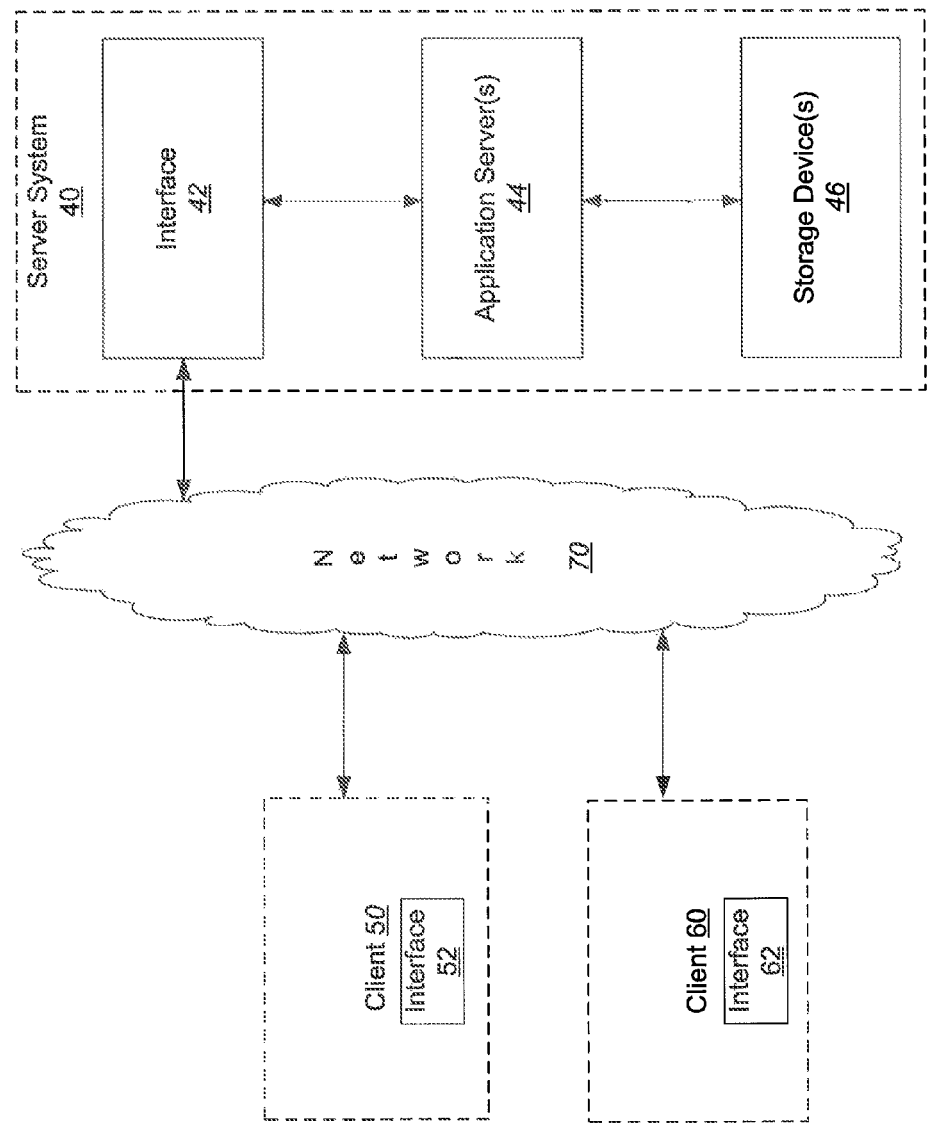
FIG. 2 illustrates a representative networking system that provides a suitable environment for use with some embodiments of the invention.

While those skilled in the art will appreciate that the invention may be practiced in networked computing environments with many types of computer system configurations, FIG. 2 represents an embodiment of the present invention in a networked environment that includes clients 50 and 60 connected to a server system 40 via a network 70. While FIG. 2 illustrates an embodiment that includes two clients connected to the network, alternative embodiments include one client connected to a network or many clients connected to a network. Moreover, embodiments in accordance with the present invention also include a multitude of clients throughout the world connected to a network, where the network is a wide area network, such as the Internet.

Electronic Reader

The present invention relates to an electronic reader. More particularly, the present invention relates to systems and methods for providing a user-controlled, electronic reader ("e-reader") having interactive and educational features. Generally, the e-reader allows the user to view text in an electronic format and to interact with the text. Additionally, the e-reader simulates certain aspects of physical print reading materials.

Figure 3:
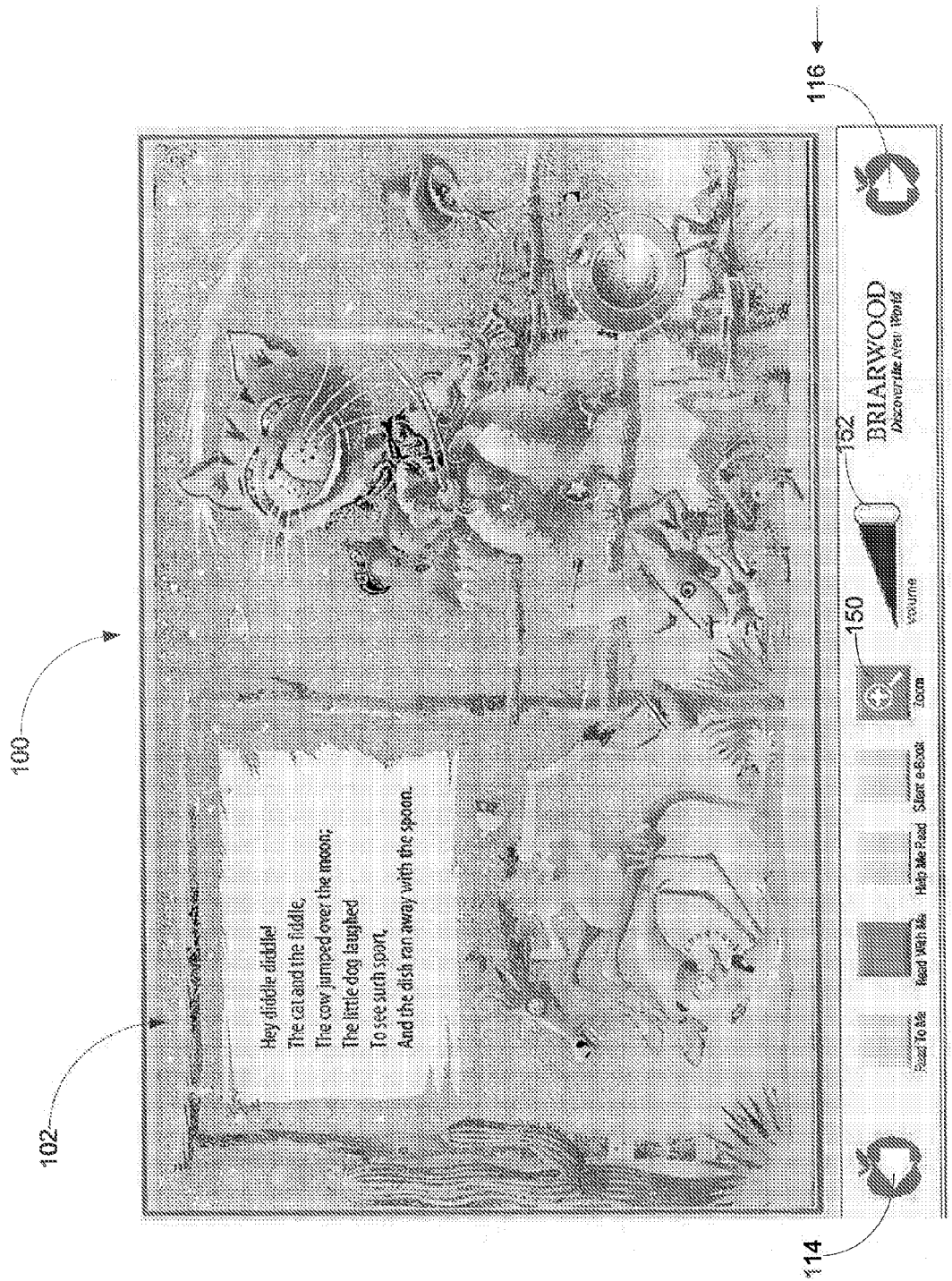
FIGS. 3-4 illustrate some embodiments of an electronic reader displaying a page of text.

The e-reader can display any text that can be presented in an electronic format. As used herein, the term "text" refers to words, documents, images, characters, symbols, designs, pages, blank areas, and any other item or material that can be visually conveyed to the user through computer readable media. For example, the e-reader can display text from books, papers, magazines, signs, Web pages, and other physical print or electronic format reading materials that can be electronically displayed. For instance, FIG. 3 shows some embodiments where the e-reader 100 displays text 102 from a children's book.

The e-reader can display text in any suitable manner or format. In one example, the e-reader can display text in substantially the same manner in which the text would be displayed in a physical print reading material. For instance, the e-reader can display text with the same color scheme and layout that is found in a corresponding physical print reading material. In another example, the e-reader can display any suitable amount of the text at a time. For instance, the e-reader can simultaneously display any suitable number of pages of a text. Indeed, FIG. 3 shows some embodiments where the e-reader 100 displays single page of text 102 at a time. However, in other embodiments, the e-reader displays two or more pages of the text at the same time. In such embodiments, the e-reader can display multiple pages of text in any suitable manner. For instance, the e-reader can present two pages, side by side (as is found in physical print books), end to end, or in any other suitable configuration.

In some embodiments, the e-reader is implemented in association with a computer program product used within a computer system and/or network. As previously mentioned, a suitable computer system includes a visually perceptible output device ("screen"), such as screen, monitor, or another visualization device. Additionally, a suitable computer system comprises a tactile input device ("input device"), such as keyboard, touchpad, touch-screen, trackball, mouse, stylus, or another pointing device. With such a computer system, the user views the text on the screen and is able to interact with the text and the e-reader by using the input device.

In some embodiments, the e-reader is configured to allow the user to utilize the input device to select at least a portion of the text (e.g., a word) that is displayed on the screen. In such embodiments, the user can select the desired portion of text in any suitable manner. For example, the user can select the desired portion through the use of a soft select, a hard select, or both. As used herein, the term soft select refers to distinguishing a portion of the displayed text by passing a pointer, cursor, underscore, finger, stylus, or the like ("pointer"), over or near the portion of the text. In some cases, the soft select can be registered by moving the pointer across or near a portion of the text from any direction. Also, as used herein, the term hard select refers to distinguishing a portion of the displayed text by clicking, tapping, or touching the portion; stroking a key when the pointer is near or over the portion; passing the pointer over the portion from specific direction (e.g., from the left at any desired angle), or otherwise indicating that more than a soft select is required.

Figure 4:
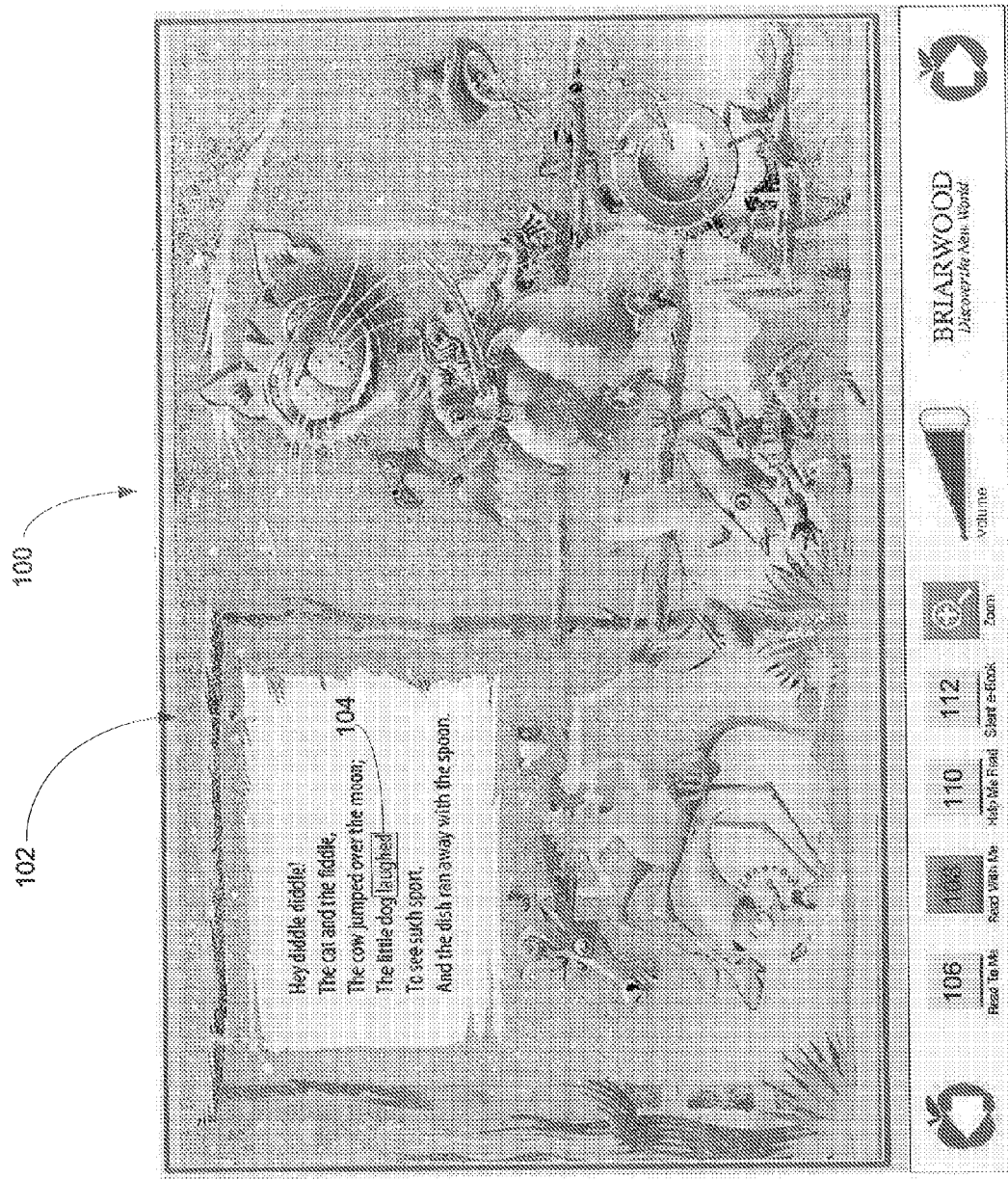

In some embodiments where the user selects a portion of the text, the selected portion is visually and/or audibly emphasized. Where the selected portion is visually emphasized, it is highlighted, outlined, underlined, italicized, bolded, enlarged, capitalized, and/or otherwise distinguished from another portion in the text in any other visually perceivable manner. By way of illustration, FIG. 4 shows some embodiments of the e-reader 100 where a selected portion 104 of the text 102 is highlighted and outlined.

Where the selected portion is audibly emphasized, it may be audibly vocalized, sounded out, spelled out, vocalized as syllables, and/or otherwise distinguished from another portion of the text in any other suitable and audibly perceptible manner. By way of example, the selected portion can be pronounced in any suitable manner, including through the use of an audio recording of a human voice or a computer-generated synthesized voice pronouncing the selected portion.

Where the selected portion is both visually and audibly emphasized, it can be emphasized in any suitable manner that both visually and audibly distinguished it from another portion of the text. In one example, the selected portion 104 (as illustrated in FIG. 4) is verbally pronounced as well as highlighted and outlined.

In certain embodiments, the manner in which a portion of text is selected determines the type of emphasis that is given to the selected portion. In one example, text that is soft selected is visually emphasized, audibly emphasized, or both. Similarly, in another example, text that is hard selected is visually emphasized, audibly emphasized, or both. In still another example, the soft select has no effect on the text while the hard select does. Conversely, in yet another example, the hard select has no effect on the text while the soft select does.

In some embodiments, the soft select and the hard select have different effects on the text. In such embodiments, the soft and the hard select may have any suitable combination of effects on the text. In one example, where the soft or the hard select visually emphasizes a word, the other type of select audibly emphasizes the word. In another example, where the soft or the hard select audibly emphasizes a word, the other type of select visually emphasizes the word. In still another example, where the soft or the hard select both visually and audibly emphasizes a word, the other type of select has no effect on the word. In a final example, where the either the soft or the hard select only visually or audibly emphasizes a word, the other type of select has no effect on the text.

In some embodiments, the user determines the effect of a soft or hard select on a word by choosing a specific reading setting (e.g., settings 106, 108, 110, or 112, illustrated in FIG. 3). Although the e-reader can have any suitable reading setting, some examples of suitable reading settings are described below in more detail.

In a first example of suitable reading settings, the e-reader is set so the soft select visually emphasizes selected portions of the text and the hard select audibly emphasizes the selected portions. Some embodiments where the e-reader comprises two such settings are illustrated in FIG. 3, wherein the e-reader comprises a Read With Me 108 and a Help Me Read 110 setting.

In some embodiments, the Read With Me setting allows the user to visually emphasize portions of the text by a soft select and audibly emphasize portions by a hard select. Although the soft and the hard select can be registered in any suitable manner, in some embodiments, the soft select is registered by passing the pointer over or near a word from any direction and the hard select is registered by passing the pointer over the word from the left, at any desired angle. In such embodiments, the e-reader will both highlight and pronounce words as the pointer passes over them from the left, or the direction in which the English language is normally read. However, if the reader passes the pointer over a word from a direction besides the left, the e-reader will only highlight the word and not pronounce it. Accordingly, the Read With Me setting may reduce the amount of words that are unintentionally pronounced as the user moves the pointer to words the user wants pronounced. Although such a setting may be desirable in many circumstances, in some circumstances, the Read With Me setting is particularly useful for a user that is a just beginning to read.

In some embodiments, the Help Me Read setting allows the user to visually emphasize a portion of the text by registering a soft select when the user passes the pointer over or near the portion of the text. Nevertheless, in this setting the hard select requires more than passing the pointer over the word from the left. Although the hard select can be registered in any manner besides simply passing the pointer over a word from a specific angle, in some embodiments, the hard select requires the user to click, touch, tap, etc. on or near a word before the word audibly emphasized. Accordingly, in the Help Me Read setting, the user may move the pointer across portions of the text from the any direction, including from the left the user reads the words and thereby register a soft select and highlight the selected words. However, the e-reader will not audibly pronounce the words unless the user clicks on or otherwise hard selects a portion. While such a setting may be desirable in many circumstances, in certain circumstances, the Help Me Read setting may be particularly useful where the user is somewhat proficient at reading but still struggles with reading or pronouncing a few words.

Figure 5:
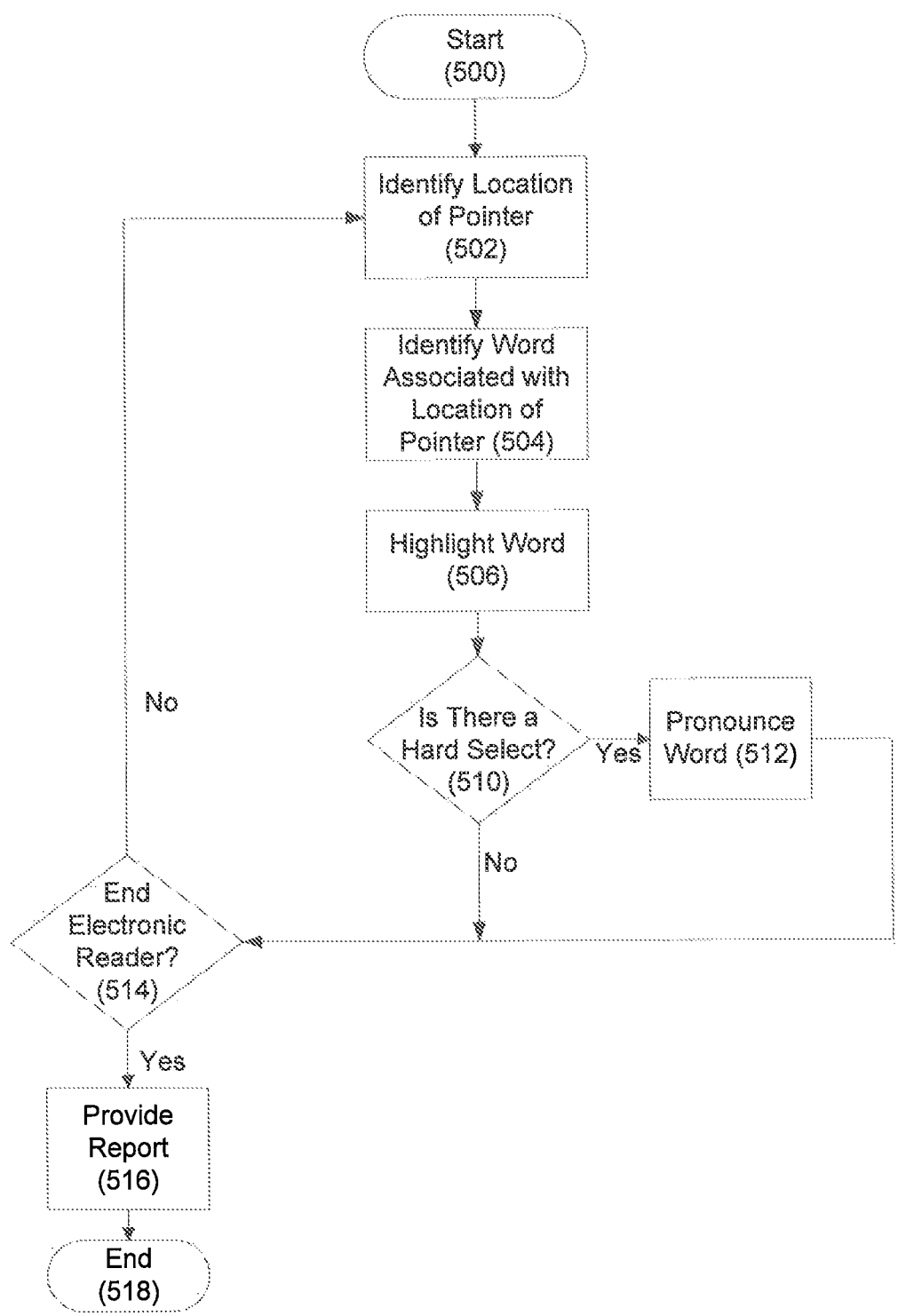
FIGS. 5-7 illustrate various flow charts depicting some embodiments of the operation of the described electronic reader.

Although the Read With Me and the Help Me Read settings have different manners in which the hard select is registered, in some embodiments, the e-reader may perform the two settings in substantially similar manners. By way of illustration, FIG. 5 shows a non-limiting example of a method the e-reader follows to perform the two settings. Specifically, this example begins at 500 where the e-reader starts by displaying a text. At 502, the e-reader determines the position of the pointer. If the pointer is located over or near a word, the e-reader determines that the word has been soft selected. As shown at 504, the e-reader identifies the word that has been soft selected. Then at 506, the e-reader highlights that soft selected word.

At decision block 510, the e-reader determines if the word has also been hard selected. For instance, if the e-reader is set to the Read With Me setting, the e-reader will determine if the pointer was moved across the word from the left. However, if the e-reader is set to the Help Me Read setting, the e-reader will determine if the user hard selected the word by clicking, tapping, touching, or otherwise hard selecting word in a manner different from passing the pointer over the word. If the word has been hard selected, the e-reader pronounces the word, as shown at 512.

If at 510 the e-reader determines that the word was not hard selected, decision box 514 shows the e-reader determines whether to end the current application. Similarly, after the e-reader pronounces a word that has been hard selected, as shown in 512, the e-reader determines whether the e-reader should end. If the e-reader determines that it should not end the application, the process is repeated again, starting at 502. However, in some embodiments, if the e-reader determines that it should end the application, the e-reader provides a report at 516 (described hereinafter) before ending at 518.

In a second example of a suitable reading setting, the e-reader is set so the soft select visually emphasizes selected portions of the text and the hard select has no effect on the selected portion. Some embodiments where the e-reader comprises such a setting are illustrated in FIG. 3, wherein the e-reader comprises a Silent e-book setting 112.

In some embodiments, the Silent e-book setting allows the user to visually emphasize portions of the text by a soft select but does not visibly or audibly emphasize portions when they are hard selected. Although the soft select in the Silent e-book setting can be registered in any suitable manner, in some embodiments, the soft select is registered by passing the pointer over or near a word from any direction. While the Silent e-book setting is desirable for many applications, in some cases, the Silent e-book setting is especially useful where the user is a proficient reader and desires to visually emphasize text as the user reads it.

Figure 6:
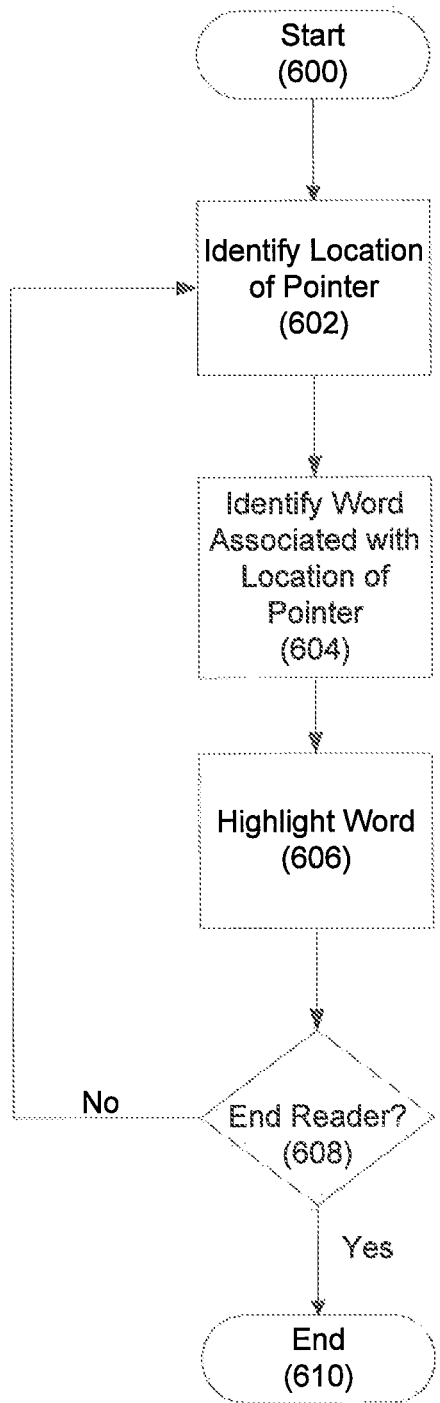

The e-reader can perform the Silent e-book setting in any suitable manner. By way of illustration, FIG. 6 shows one example of a method for performing the Silent e-book setting. Specifically, this example begins at 600 where the e-reader starts by displaying the text. At 602, the e-reader identifies the location of the pointer. If the pointer is over or near a word, 604 shows the e-reader identifies the word associated with the location of the pointer as being soft selected. Then at 606, the e-reader visually emphasizes (e.g., highlights) the word that has been soft selected. Next, at 608, the e-reader determines whether to continue to 610 and end the reading session or to return to 602 and repeat the process again.

In a third example of a suitable reading setting, the e-reader automatically visually and/or audibly emphasizes words in the text. Moreover, the user can follow along and/or emphasize portions of the text in any suitable manner. For example, where the e-reader automatically pronounces the words of a text, the user can follow along in the text and use the pointer to highlight the words as they are pronounced. In another example, where the e-reader automatically highlights individual words at a desired reading rate, the user can follow along and select some or all of the words to be pronounced. In still another example, the user can watch and listen as the e-reader automatically emphasizes words, both visually and audibly.

Some embodiments where the e-reader comprises such a setting are illustrated in FIG. 3, wherein the e-reader comprises a Read To Me setting 106. According to some embodiments, the Read To Me setting automatically audibly emphasizes (e.g., pronounces) each word of the text and allows the user to visually emphasize words, as desired. Accordingly, the user can have the text read aloud and follow along by visually emphasizing the text as it is pronounced by the e-reader. While the Read To Me setting may be desirable for use in a variety of circumstances, in some cases, it is particularly useful where the user is not able, or chooses not to, read aloud.

Figure 7:
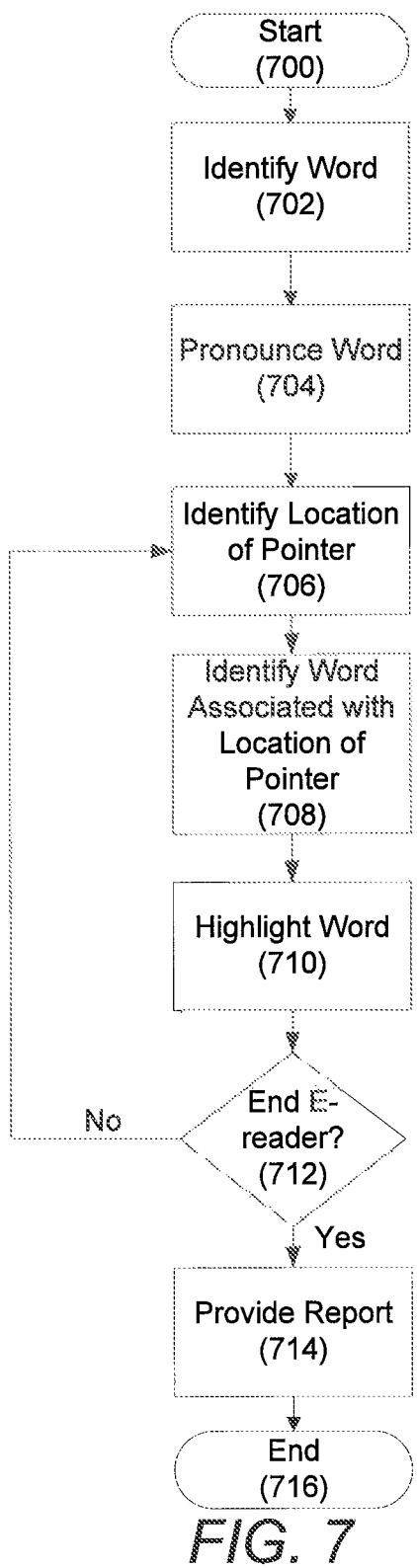

Although the e-reader can perform the Silent e-book setting in any suitable manner, FIG. 7 shows an example of a typical method in which the e-reader performs the Silent e-book setting. In particular, FIG. 7 shows the e-reader begins at 700 by displaying text 102 (as illustrated in FIG. 3). At 702, the e-reader identifies words of the text. Then at 704, the e-reader verbally emphasizes each word in the appropriate order. For instance, the e-reader pronounces the words of the text 102 in FIG. 3, "Hey diddle diddle . . . ." At any suitable time, box 706 shows the e-reader determines the location of the pointer. Next, at 708, after the e-reader identifies a word associated with the location of the pointer as being soft selected, the e-reader highlights the word. At decision box 712, the e-reader determines whether to terminate the e-reader or to continue allowing the user to highlight words by returning to 706. In some embodiments where the e-reader determines to end the application, the e-reader provides a report, as shown at 714, before ending at 716.

The user can select from the various reading settings (e.g., Read With Me, Help Me Read, Silent e-book, and Read To Me) in any suitable manner. For example, FIG. 3 shows some embodiments where the e-reader comprises toggle boxes 106, 108, 110, and 112. In FIG. 3, the user can select a particular setting by selecting a corresponding box at virtually any time before, after, and/or during use of the e-reader.

The rate at which the e-reader emphasizes portions of a text (visually and/or audibly) in the various reading settings may be determined in any suitable manner. In one example, the rate at which the e-reader emphasizes words in the text can be determined by default settings, user preferences, and/or the rate at which the user selects the words in the text with the input device. Where the user determines the rate at which words are emphasized, the user may increase decrease, or maintain the rate substantially constant. Accordingly, in some embodiments, the e-reader emphasizes (e.g., audibly) words at a dynamic rate controlled by the user. In other embodiments, the e-reader automatically reads at the most recent speed at which the user selected words. Thus, in such embodiments, the e-reader does not cease to emphasize words, when the user stops selecting them.

In some embodiments, the e-reader gathers information, including, but not limited to, information associated with the user, the text, and/or others (e.g., an instructor). In such embodiments, the e-reader can gather information from a single use of the e-reader or from a plurality of uses. Similarly, the e-reader can gather information from a single user or another as well as from a plurality of users or others (e.g., instructors).

Although the e-reader can gather any suitable information associated with the user, some non-limiting examples of suitable user information include the speed at which the user reads, the speed at which the user selected words, the speed at which the user changes pages, the words the user selected, the number of times the user selected each word, the manner in which the user selected a word (e.g., hard or soft select), the manner in which the word was emphasized (e.g., pronounced, sounded out, highlighted, etc.), personal information (e.g., age, sex, language spoken, teacher's name, goals, etc.), personal preferences, and so forth.

While the e-reader can gather any suitable information associated with the text, some non-limiting examples of suitable information can include word length, sentence length, sentence structure, word frequency, word type, word characteristics (e.g., type of vowel sounds, type of consonant blending, silent letters, compound words, prefixes, suffixes, root words, irregular pronunciation, spelling), word location within the text, and so forth.

In some embodiments, the some or all or the gathered information can be reported in any suitable manner. In one example, the gathered information can be presented as raw data, or it can be aggregated, analyzed, categorized, organized, or otherwise manipulated. In another example, the gathered information can be reported at any suitable time, including before, after, and/or while the user is using the e-reader to view text. In still another example, the gathered data can be reported to another computer or any suitable person, including the user, a parent, a teacher, a tutor, an instructor, etc.

The reports can be used for many purposes. In some embodiments, the reports are used to assess the user's reading skills, weaknesses, problematic words, problematic pronunciations, progress, reading pace, and the like. In such embodiments, the reports can be used by the user, the e-reader, or any other person (e.g., a parent, teacher, tutor, etc.) to monitor the user's reading skills, to immediately identify areas in which the user lacks understanding, and/or to customize a reading experience for the particular user.

In some embodiments, the e-reader simulates some aspects of physical print reading materials. Indeed, the electronic reader can have any characteristic that allows it to appear similar to physical print reading materials or be used in a similar manner. In some cases, for instance, the e-reader allows pages to be turned in a manner similar to that in which pages are turned in some physical print reading materials.

Where all pages of the text are not displayed by the e-reader in a single view, the user can change pages to view additional text in any manner. For instance, the user can view additional pages by scrolling, by selecting arrows, selecting page numbers, or, as mentioned, by simulating the turning of a page of a physical print reading material. In one example, FIG. 3 shows some embodiments where the e-reader 100 comprises arrows 114 and 116 that allow the user to select a textual view (e.g., a page) that precedes or follows the current textual view.

Where the e-reader simulates the turning of a page of a physical print reading material, the e-reader can simulate physical page turning in any suitable manner. Indeed, in some embodiments, one page of text is peeled away from its original position to reveal one or more additional pages.

For example, where the e-reader displays two pages of text that are connected side by side (or end to end) and are joined at a common edge, one page can be peeled back from its original position, pivoted around the common edge, and be rested face down and opposite to its original position so as to reveal two additional pages.

In another example, where the e-reader displays a single page of text at time, a first page can be peeled over to show a second page of text. In one example, the first page can be peeled from its original position, pivoted about a single edge, and then be made to appear to rest behind a second page so that only the second page is visible.

Figure 8:
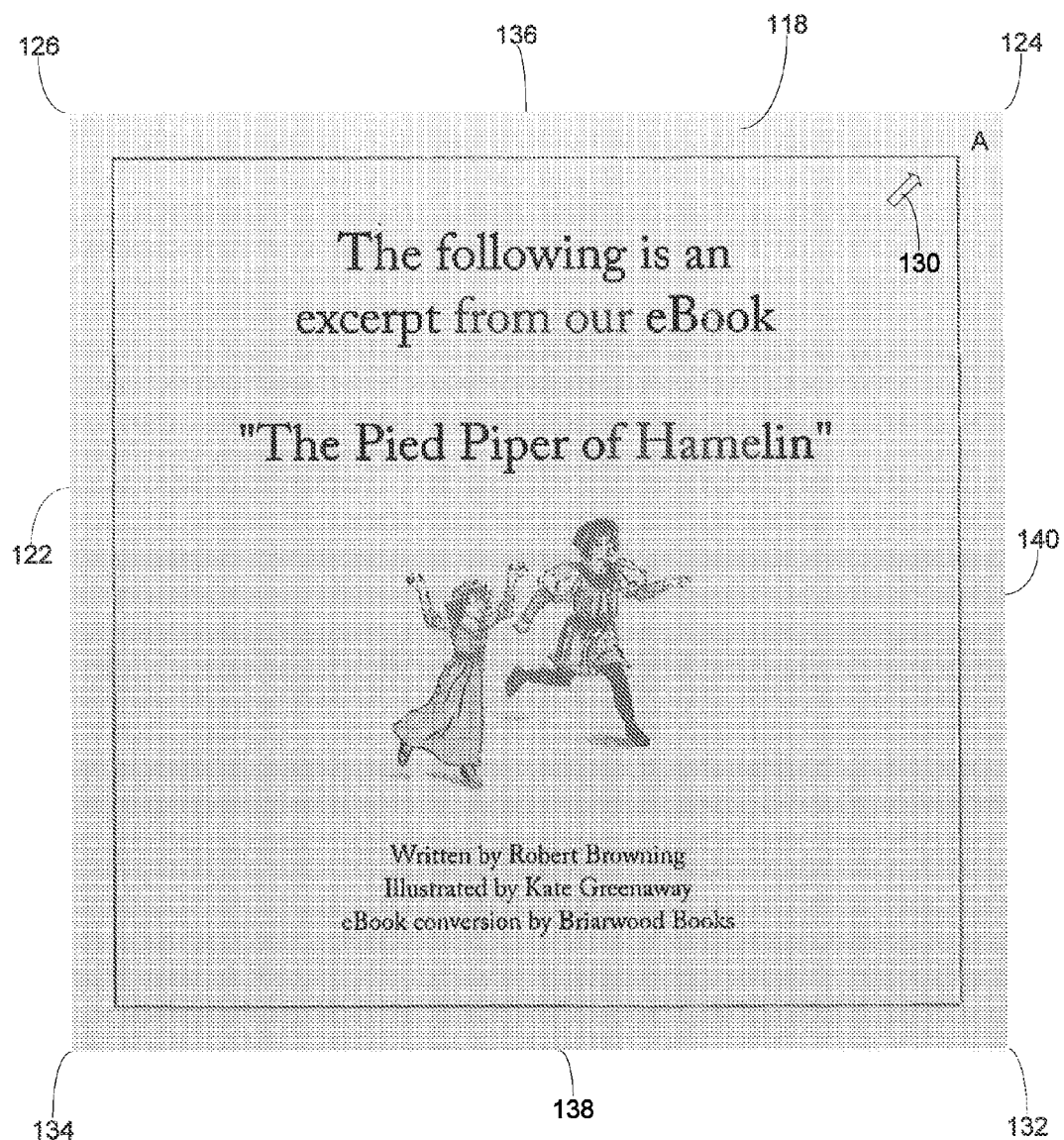
FIGS. 8-12 illustrate some embodiments of the described electronic reader showing some methods for the turning of pages of text.
Figure 9:
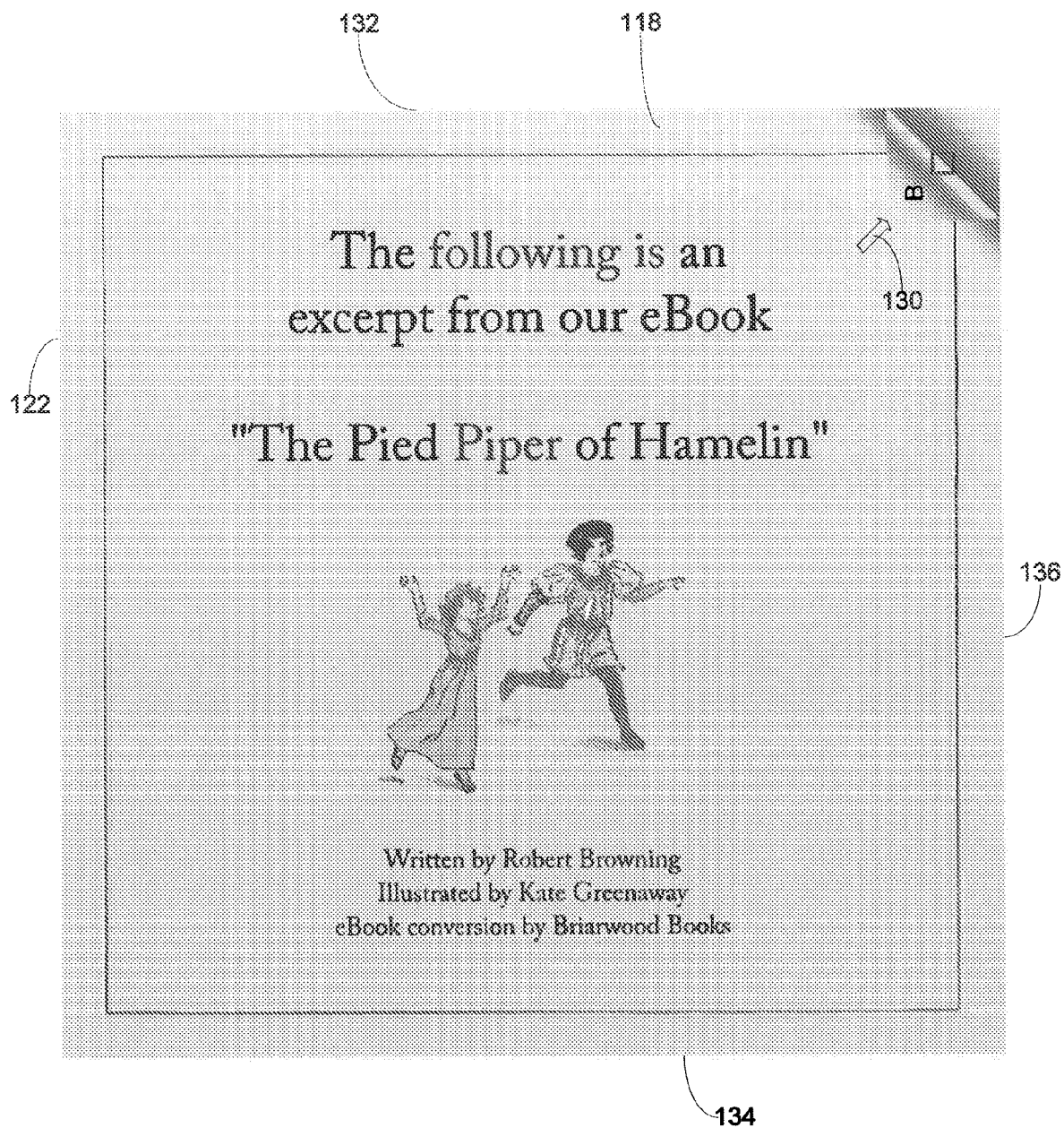
Figure 10:
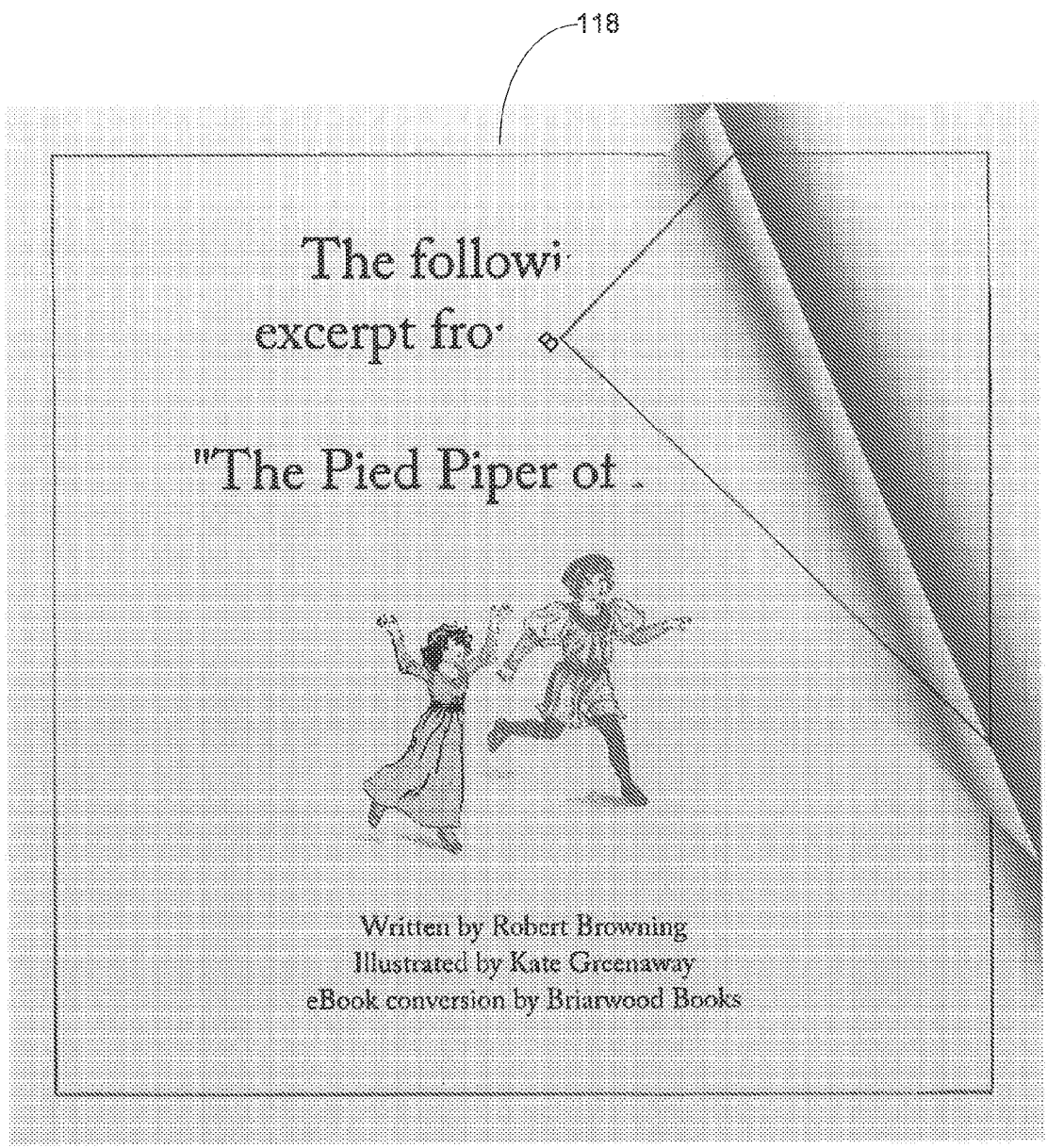
Figure 11:
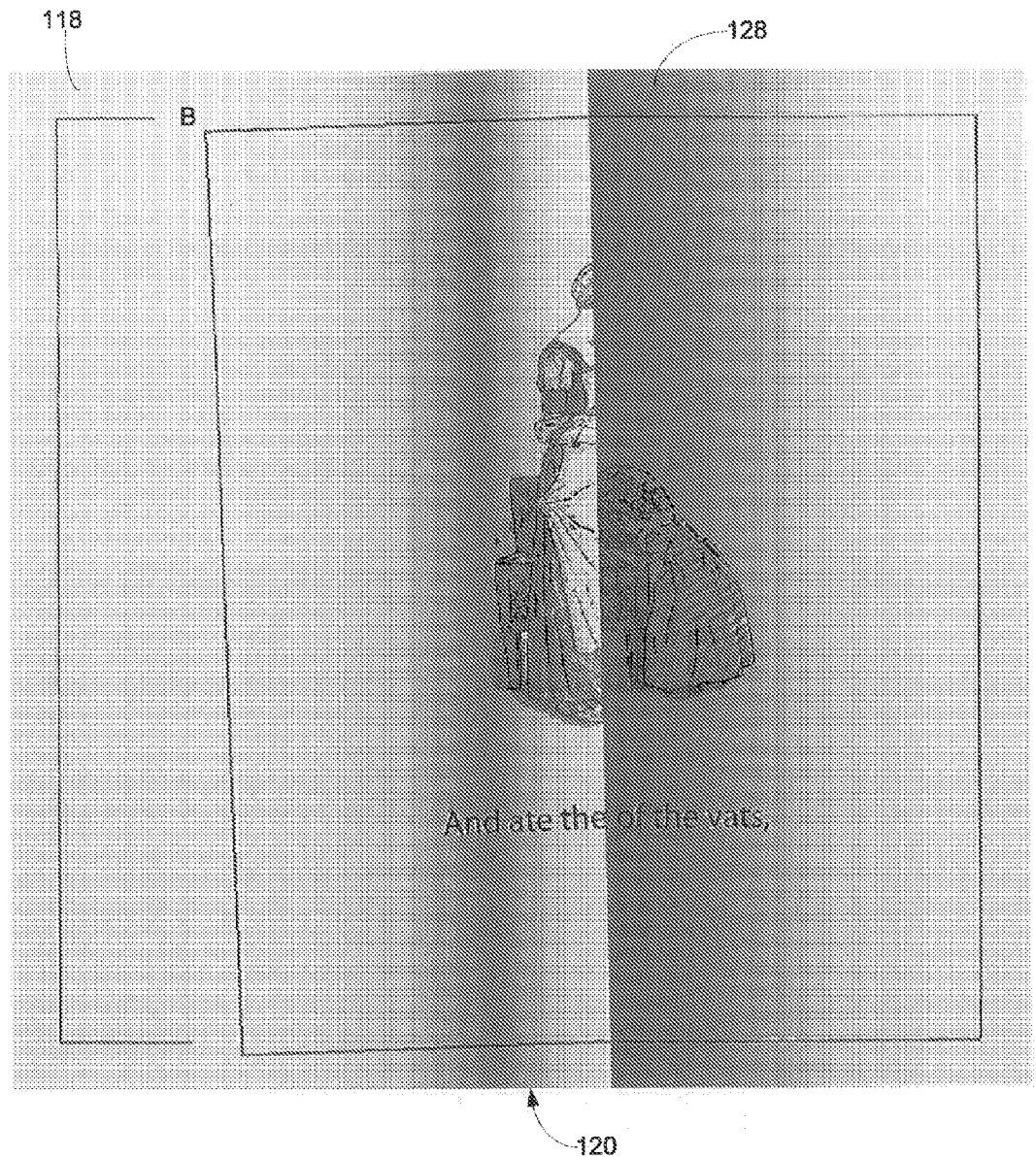
Figure 12:
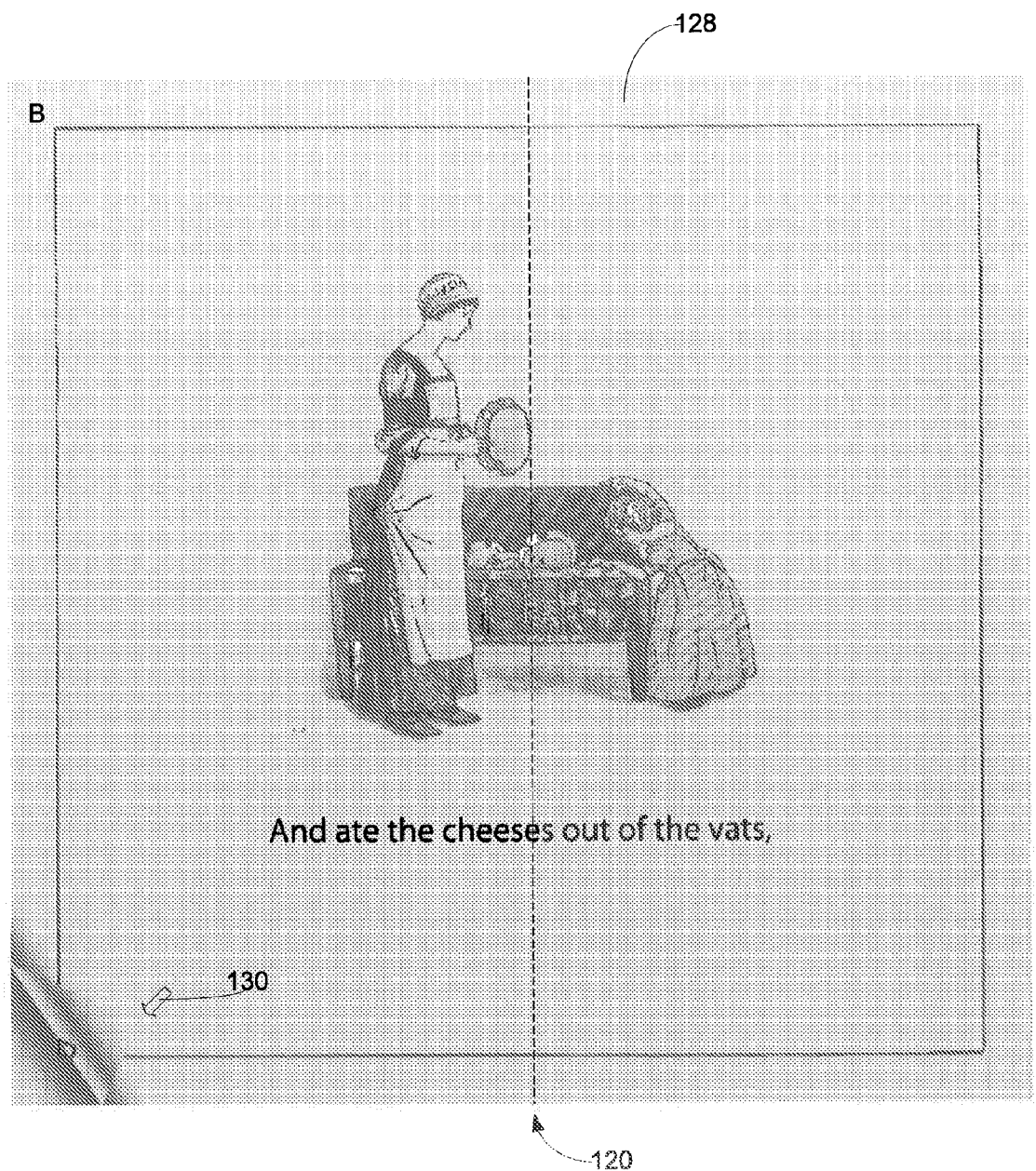

In a second example, FIGS. 8-12 illustrate some embodiments where the first page 118 of text is peeled back from its original position and pivoted about an axis within the page. Specifically, FIG. 8 illustrates some embodiments where the e-reader 100 displays a single page 118 of text at a time. In order to change the textual view and show another page, FIG. 9 shows that a first perimeter (e.g., a corner A or an edge) of the page 118 can be curled back to expose a portion of a backside of the page (e.g., a corner B). FIG. 10 illustrates that the first perimeter (e.g., the perimeter common to corners A and B) can be further be peeled away from its original position. FIG. 11 shows that instead of pivoting about an edge of the text (e.g., a left-hand edge 122), the perimeter (e.g., corner B) is pivoted about an axis 120 located within the page 118. Although the first perimeter can be moved to any other desired perimeter of the first page, FIG. 12 shows a representative embodiment where the first perimeter (e.g., the perimeter common to corners A and B) is pivoted around the axis 120 until the perimeter rests in a corresponding opposite perimeter of the view to reveal the second page. Indeed, FIGS. 8-12 show a representative embodiment where the first perimeter (e.g., the perimeter common to corners A and B) is peeled from its original position at the upper-right-hand corner 124 of the is the first page 118 over to the upper-left-hand corner 126 of the first page 118 where the corner A is face down so as to reveal the second page 128.

Where the pages of the text are turned by being peeled away to reveal additional pages, the user can initiate the page turning in any suitable manner. For example, the user can cause a page to turn by soft selecting, hard selecting, or both hard and soft selecting a desired perimeter of a page of text. In one example, FIGS. 7 and 8 illustrate that when the pointer 130 is moved towards a perimeter of the page (e.g., corner A), the e-reader registers a soft select and the perimeter is caused to curl back, as shown in FIG. 8. In this example, the user can then cause the page 118 to turn by hard selecting the perimeter (e.g., the perimeter common to corners A and B). For instance, the user can click the pointer 130 on corner A or B and cause the first page 118 to be turned.

Where the user initiates page turning by selecting a perimeter of the page, the user can select any suitable perimeter, including a corner (e.g., an upper-right-hand corner 124, an lower-right-hand corner 132, an upper-left-hand corner 126, or a lower-left-hand corner 134) or an edge (e.g., an upper edge 136, a lower edge 138, a left-hand edge 122, or right-hand edge 140), as shown in FIG. 8. By way of illustration, the user may select a perimeter on the right side of the view (e.g., the upper-right-hand corner 124, the lower right-hand corner 132, or the right-hand edge 140) or the top of the view (e.g., the upper edge 136) to turn the pages and progress forward through the text. Conversely, the user may select a perimeter of the left side of the view (e.g., the upper-left-hand corner 126, the lower left-hand corner 134, or the left-hand edge 122) or the bottom of the view (e.g., the lower edge 138) to turn the pages back so as to return to previous pages in the text.

Figure 13:
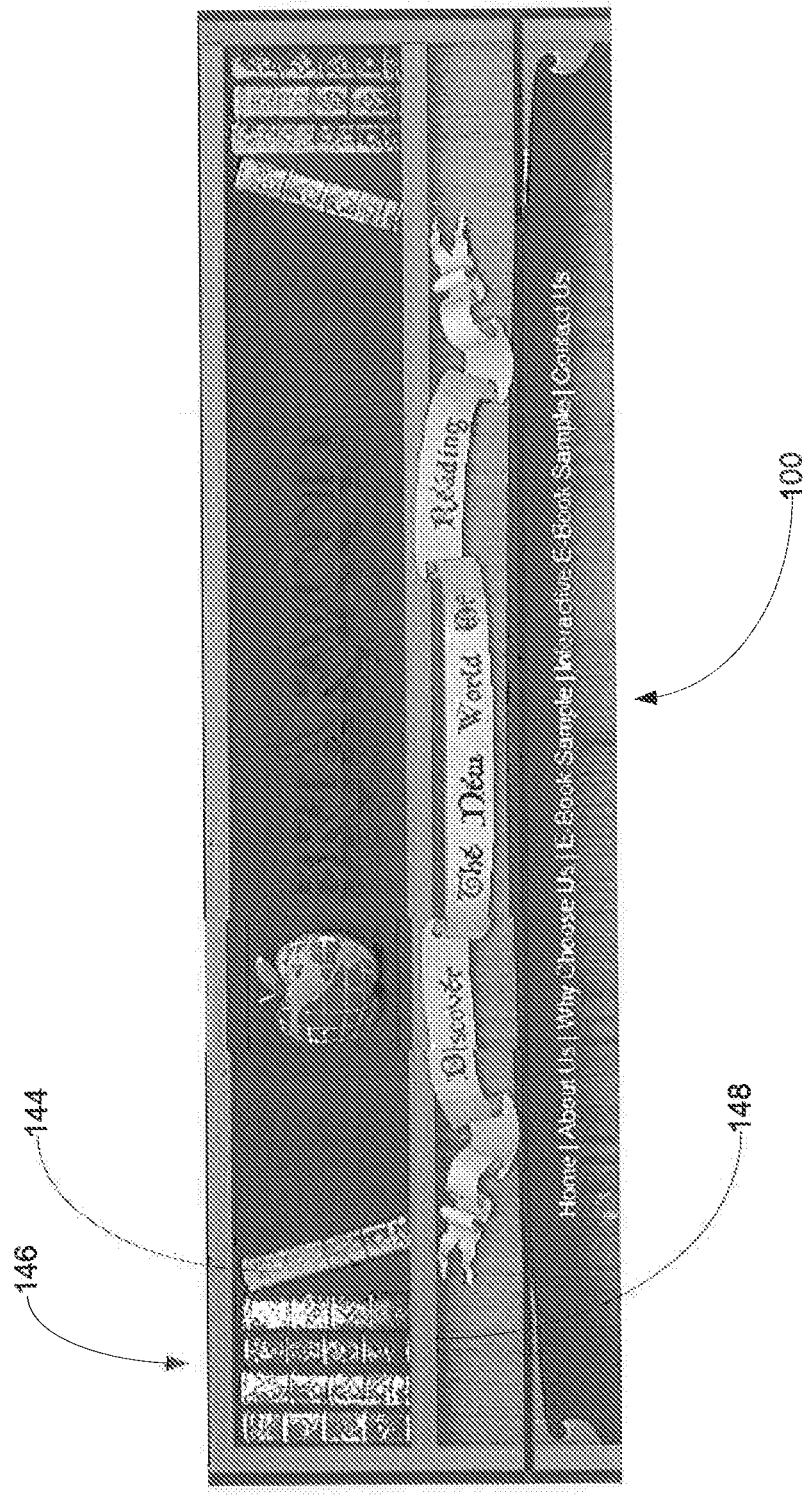
FIG. 13 represents a virtual library for use with some embodiments the electronic reader.

In some embodiments, the e-reader has aspects that resemble certain characteristics of a bookstore or library. Indeed, the e-reader can have any characteristic that allows it mimic a bookstore, library, or aspect of the use of physical print reading materials. In one example, the e-reader allows the user to check out books from a virtual library. In another example, FIG. 13 shows some embodiments where the e-reader 100 has a virtual bookshelf 142. In this example, the user may select a desired text (e.g., book 144) from a collection of books 146 on the bookshelf 148. Further, the user can store a text (e.g., book 144) on the bookshelf 148 for later retrieval. In this manner, the e-reader can further simulate the experience of using and reading a physical print reading material.

In some embodiments, the e-reader allows the user to further interact with the text by providing links from the words in the text to additional data. In such embodiments, words of the text can be linked to any suitable data. In some examples, words in the text are linked to one or more related definitions, synonyms, antonyms, words, tenses, related texts (e.g., related books, encyclopedia entries, articles, news, history, contextual statements, etc.), merchandise, and/or any other relevant data. Accordingly, the user can interact with the e-reader to access more information than may be found in the corresponding physical print reading material.

In addition to the previously mentioned components and characteristics, the e-reader can have any other component or characteristic suitable for its use. By way of example, FIG. 3 shows some embodiments where the e-reader 100 comprises zoom controls 150 and/or volume controls 152. In another example, the e-reader comprises recording capabilities, autophonic analysis tool, or other components that allow the user, the e-reader, or another to analyze the user's reading skills.

While in some embodiments the e-reader is used over a network 70, such as the Internet, in other embodiments, the e-reader is used on a client. In either case, the e-reader may be used in any appropriate manner. For example, where the e-reader is used over a network, the e-reader and/or the text can be downloaded to the client or can be accessed through a non-downloadable interactive embodiment, such as a web browser connected to a network-accessible server capable of streaming portions of text to the web browser. Thus, in some embodiments, the e-reader may be used when the client is connected to or disconnected from the network. Additionally, in some embodiments where the e-reader and/or texts for the e-reader are available over a network, texts may be purchased through a subscription.

Figure 14:
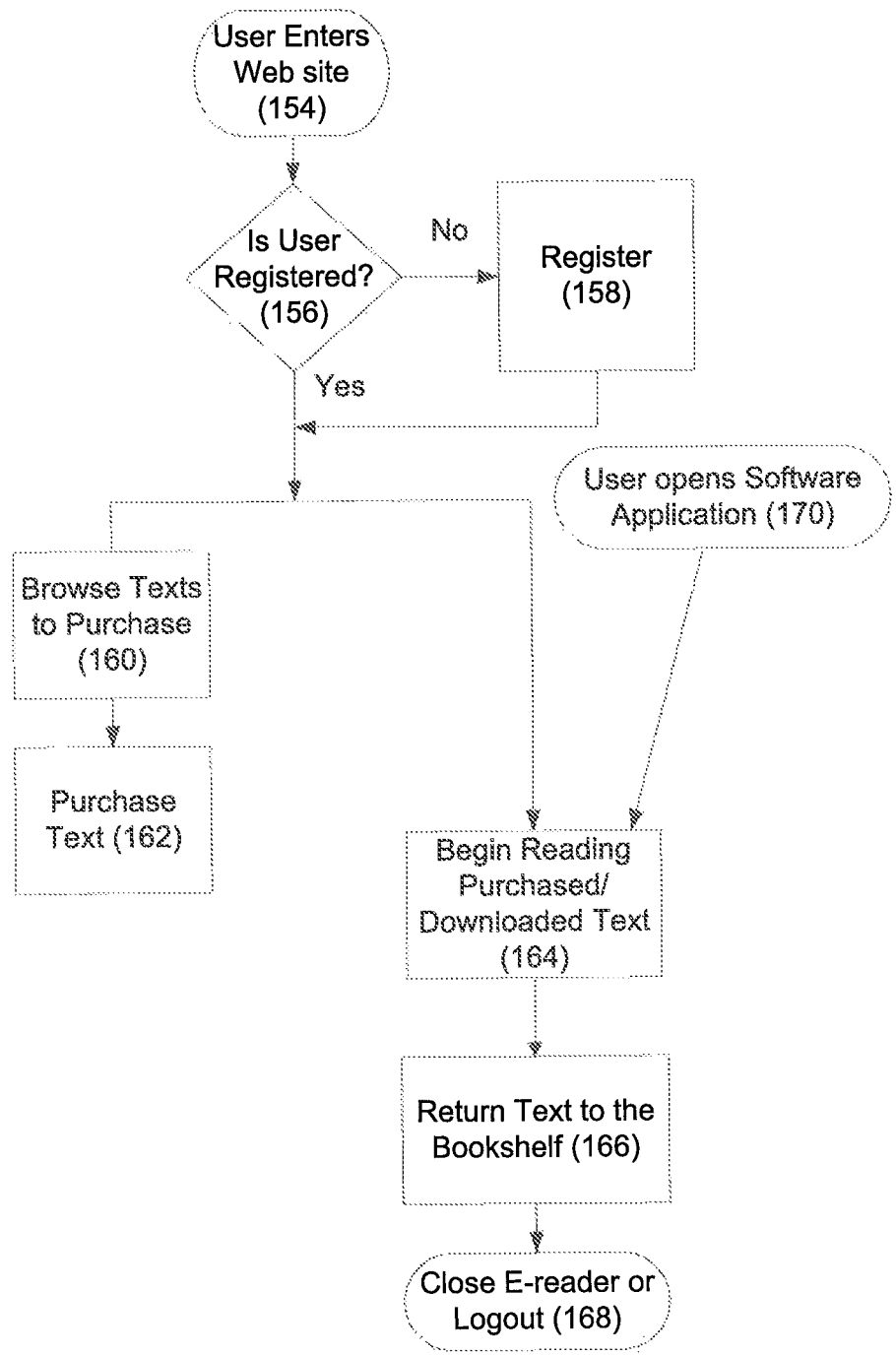
FIG. 14 illustrates a flow chart showing some embodiments of how the electronic reader can be used.

While the e-reader can be used in any suitable manner, FIG. 14 shows one non-limiting example of a typical method for its use. Specifically, FIG. 14 illustrates that, in a representative embodiment, the user enters a website 154 where the e-reader determines if the user has registered, as shown at 156. If the user is not registered, the user proceeds to register at 158. This way, the user is identified and records of the user's prior text purchases are stored so that the user may access them, as desired. If the user is already registered, or once the user registers, the user proceeds to either browse texts to purchase at 160, purchases a text at 162, or begins reading at 164. Where the user begins reading a text, the aforementioned features and concepts (e.g., visual and/or audible emphasis, reports, linking, etc.) are available. Before closing the e-reader or logging out at 166, the user places the text back on the bookshelf 166.

Alternatively, if the user does not make a purchase and already has downloaded the e-reader and/or suitable texts, the user may bypass steps 154-162 and merely open the e-reader at 170 and begin reading the texts previously downloaded. In other words, once the user has texts on a client, there is no need to be online.

The e-reader offers several benefits or advantages. In one example, because the e-reader allows the user to select portions of the text to be visually and/or audibly emphasized, the e-reader can teach beginning readers how to read in a self-directed manner. Furthermore, the e-reader can help the user learn to read at the user's pace and according to the user's individual needs. Additionally, because the e-reader allows the user to select desired portions of the text, the e-reader is interactive and can keep the user's attention.

In another example, because the e-reader allows the user to choose from a variety of settings for presenting the text (e.g., Read To Me, Read With Me, Help Me Read, and Silent e-book), the e-reader may be configured to be used with users of different ages and reading abilities.

In still another example, because the e-reader can collect information about the user and the text, the user, the e-reader, or another can assess the strengths and weakness of the user. Additionally, because the e-reader can report the collected information, an instructor need not be physically present while the user reads a text in order to determine the user's reading skills and shortcomings. Moreover, because the electronic reader gathers information about the user and/or the text, the c-reader can collect information that is used to specifically market and target products (e.g., books, text, merchandise, etc.) to the user. For instance, where the c-reader determines that the user likes books relating to pirates, the e-reader can provide the user with a hyperlink to advertising or a site to purchase books and materials on pirates. Accordingly, the electronic reader may act as an electronic bookstore.

In a final example, because the c-reader can simulate certain aspects of reading a physical print reading material, such as page turning by peeling back pages, the c-reader can provide a comfortable and familiar reading experience.

The present invention may be embodied in other specific forms without departing from its spirit or essential characteristics. The described embodiments and examples are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for utilizing an electronic reader to provide output by the electronic reader at a rate corresponding to a user in order to overcome a lack of user-specific focus, the method comprising:
  providing, by a processor of a computer system, a text for digital access within the computer system, the computer system comprising a tactile input device and a visually perceptible output device;
  displaying, by the processor, a first page of the text on the visually perceptible output device;
  providing, by the processor, a user-controlled visualization in which the first page is configured to be turned to reveal a second page, wherein as the first page turns, a first perimeter of the first page is configured to appear to be peeled away from its original position, such that a portion of the first page appears to pivot about an axis, and such that the first portion of the first page appears to be placed face down to reveal the second page;
  causing, by the processor, the first perimeter to appear as though it is curling back from its original position when a user passes a pointer over the first perimeter;
  causing, by the processor, the first perimeter of the first page to appear to be peeled away from its original position and the first page to be turned when the user hard selects the first perimeter, wherein the hard selection comprises an action that is different than passing the pointer over the first perimeter; and
  visually emphasizing, via the processor, a word of the text through the visually perceptible output device so as to distinguish the word from a surrounding word in the text when the pointer passes over or near the word from any direction,
  wherein the word is at least one of:
    (a) audibly and visually emphasized at a rate determined by the user when the pointer passes over or near the word in a reading direction, and wherein the pointer is required to pass over or near the word in the reading direction in order for the word to be both audibly and visually emphasized, and
    (b) visually distinguished on the visually perceptible output device from the surrounding word through a first selection process which occurs when the pointer passes over or near the word, and in which the word is audibly emphasized when the word is selected through a second selection process that comprises an action that is different from the first selection process, and wherein a report of words selected through the second selection process is generated.

2. The method of claim 1, wherein the axis is disposed within the first page between the first perimeter and a second perimeter that is disposed substantially opposite to the first perimeter, and wherein the first perimeter of the first page is configured to be peeled over to the second perimeter of the first page as the first page is turned.

3. The method of claim 1, wherein the first perimeter of the first page comprises at least one of an upper-right-hand corner, a lower-right-hand corner, an upper-left-hand-corner, a lower-left hand corner, an upper edge, a lower edge, a right-hand edge, and a left-hand edge.

4. The method of claim 1, further comprising automatically audibly emphasizing the word without the word being selected and wherein the word is visually emphasized when the word is selected by the user.

5. A method for utilizing an electronic reader to provide output by the electronic reader at a rate corresponding to a user in order to overcome a lack of user-specific focus, the method comprising:
  providing a, by a processor of a computer system, a text for digital access within the computer system, the computer system comprising a tactile input device and a visually perceptible output device;
  displaying, by the processor, a first page of the text on the visually perceptible output device; and
  emphasizing, by the processor, a word of the text when the word is selected through the use of the tactile input device, wherein the emphasizing of the word includes:
    a first mode in which the word is visually distinguished on the visually perceptible output device from a neighboring word when a pointer passes over or near the word from any direction, and in which the word is audibly and visually emphasized at a rate determined by the user when the pointer specifically passes over or near the word in a reading direction, wherein the system is configured to require the pointer to pass over or near the word in the reading direction in order for the word to be both audibly and visually emphasized.

6. The method of claim 5, wherein the emphasizing of the word is further accomplishable through a second mode in which the word is visually distinguished from the neighboring word through a first selection process which occurs when the pointer passes over or near the word, and in which the word is audibly emphasized when the word is selected through a second selection process that comprises an action that is different than the first selection process.

7. The method of claim 5, wherein the emphasizing of the word is accomplishable through a third mode in which the word is visually distinguished from the neighboring word when the pointer passes over or near the word from any direction, and in which the word is not audibly emphasized.

8. The method of claim 5, wherein the emphasizing of the word is accomplished through a fourth mode in which the word is automatically audibly emphasized, and in which the word is visually distinguished from the neighboring word.

9. The method of claim 5, further comprising providing a report containing information selected from information associated with a user and information associated with the text.

10. The method of claim 9, further comprising using the report to assess a subject selected from at least one of the following: a user's reading skill, the user's reading weakness, problematic words for the user, problematic pronunciations for the user, the user's progress, and the user's reading pace.

11. A computer program product for implementing within a computer system a method for utilizing an electronic reader to provide output by the electronic reader at a rate corresponding to a user in order to overcome a lack of user-specific focus, the computer program product comprising:
  a computer-readable, non-transitory medium for providing computer program code means utilized to implement the method, wherein the computer program code means is comprised of executable code for implementing the steps for:
  providing, by a processor of the computer system, a text for digital access within the computer system, the computer system comprising a tactile input device and a visually perceptible output device;
  displaying, by the processor, a first page of the text on the visually perceptible output device; and
  emphasizing, by the processor, a word of the text at a rate determined by the user when the word is selected through the use of the tactile input device, wherein the emphasizing of the word includes at least one of the following:
(i) a first mode in which the word is visually distinguished on the visually perceptible output device from a neighboring word when a pointer passes over or near the word from any direction, and in which the word is both audibly and visually emphasized when the pointer specifically passes over or near the word in a reading direction, wherein the executable code requires the pointer to pass over or near the word in the reading direction in order for the word to be both audibly and visually emphasized; and
(ii) a second mode in which the word is visually distinguished on the visually perceptible output device from the neighboring word through a first selection process which occurs when the pointer passes over or near the word, and in which the word is audibly emphasized when the word is selected through a second selection process that comprises an action that is different from the first selection process, and wherein a report of words selected through the second selection process is generated.

12. The computer program product of claim 11, further comprising executable code for providing a user-controlled visualization in which the first page appears to be turned to reveal a second page of the text by peeling a first perimeter of the first page away from its original position such that a portion of the first page appears to pivot about an axis, and such that the first page appears to be placed face down to reveal the second page, wherein the axis is disposed within the first page between a first perimeter and a second perimeter, which is disposed substantially opposite to the first perimeter, and wherein the first perimeter of the first page is configured to be peeled over to the second perimeter as the first page is turned.

13. The computer program product of claim 11, further comprising executable code for emphasizing the word through a third mode in which the word is automatically audibly emphasized, and in which the word is visually distinguished from the neighboring word.

14. The computer program product of claim 11, further comprising compiling a report of words that are selected through the first selection process.

15. The method of claim 6, further comprising compiling a report of words that are selected through the second selection process.

16. A computer program product for implementing within a computer system a method for utilizing an electronic reader to provide output by the electronic reader at a rate corresponding to a user in order to overcome a lack of user-specific focus, the computer program product comprising:
 a computer-readable, non-transitory medium for providing computer program code means utilized to implement the method, wherein the computer program code means is comprised of executable code for implementing the steps for:
 providing, by a processor of the computer system, a text for digital access within the computer system, the computer system comprising a tactile input device and a visually perceptible output device; and
 emphasizing, by the processor, a word of the text when the word is selected through the use of the tactile input device, wherein the emphasizing of the word includes implementing:
  a first mode in which the word is visually distinguished on the visually perceptible output device from a neighboring word when a pointer passes over or near the word from any direction, and in which the word is audibly and visually emphasized at a rate determined by the user when the pointer specifically passes over or near the word in a reading direction, wherein the system is configured to require the pointer to pass over or near the word in the reading direction in order for the word to be both audibly and visually emphasized.

17. The computer program product of claim 16, further comprising executable code for implementing a second mode in which the word is visually distinguished from the neighboring word through a first selection process which occurs when the pointer passes over or near the word, and in which the word is audibly emphasized when the word is selected through a second selection process that comprises an action that is different from the first selection process.

18. The computer program product of claim 16, further comprising executable code for implementing a third mode in which the word is visually distinguished from the neighboring word when the pointer passes over or near the word from any direction, and in which the word is not audibly emphasized.

19. The computer program product of claim 16, further comprising executable code for implementing a fourth mode in which the word is automatically audibly emphasized, and in which the word is visually distinguished from the neighboring word when the word is selected.

20. The computer program product of claim 16, further comprising executable code for implementing a step for gathering information about the user's use of the computer program product over a plurality of uses of such product.

21. The method of claim 9, further comprising using the report to customize a reading experience for a particular user.

* * * * *